(12) United States Patent
Lombardi et al.

(10) Patent No.: US 12,281,536 B2
(45) Date of Patent: Apr. 22, 2025

(54) BLOWOUT PREVENTER AND COMPONENTS THEREOF

(71) Applicants: James Lombardi, Llano, CA (US); Mark Parrott, Llano, CA (US)

(72) Inventors: James Lombardi, Llano, CA (US); Mark Parrott, Llano, CA (US)

( * ) Notice: Subject to any disclaimer, the term of this patent is extended or adjusted under 35 U.S.C. 154(b) by 0 days.

(21) Appl. No.: 17/960,715

(22) Filed: Oct. 5, 2022

(65) Prior Publication Data
US 2023/0313629 A1    Oct. 5, 2023

Related U.S. Application Data

(60) Provisional application No. 63/326,090, filed on Mar. 31, 2022.

(51) Int. Cl.
*E21B 33/06* (2006.01)
*C08K 3/04* (2006.01)

(52) U.S. Cl.
CPC ............ *E21B 33/061* (2013.01); *C08K 3/042* (2017.05); *C08K 2201/005* (2013.01)

(58) Field of Classification Search
CPC ....... E21B 33/062; E21B 33/063; E21B 29/04
USPC ............................................ 251/1.1, 1.2, 1.3
See application file for complete search history.

(56) References Cited

U.S. PATENT DOCUMENTS

| | | | | | |
|---|---|---|---|---|---|
| 2,427,073 | A | * | 9/1947 | Schweitzer | ............ E21B 33/062 251/264 |
| 4,398,729 | A | * | 8/1983 | Bishop | .................. E21B 33/062 251/1.3 |
| 4,447,038 | A | * | 5/1984 | Floyd | ..................... E21B 33/062 251/1.2 |
| 4,770,387 | A | * | 9/1988 | Granger | ................ E21B 33/062 251/1.3 |
| 4,986,511 | A | * | 1/1991 | Irby | ........................ E21B 33/06 277/944 |
| 5,009,289 | A | * | 4/1991 | Nance | ..................... E21B 19/10 294/102.2 |
| 5,603,481 | A | * | 2/1997 | Parker | .................. E21B 33/062 251/1.3 |
| 6,173,770 | B1 | * | 1/2001 | Morrill | ................ E21B 33/063 166/85.4 |
| 6,296,225 | B1 | * | 10/2001 | Watts | .................... E21B 33/062 251/1.3 |

(Continued)

FOREIGN PATENT DOCUMENTS

WO    WO-2005038192 A1 *    4/2005    ............. E21B 19/22

*Primary Examiner* — Daphne M Barry

(74) *Attorney, Agent, or Firm* — Ferguson Case Orr Paterson

(57) ABSTRACT

This disclosure relates generally to blowout preventers, or "BOPs," for use in a well. The BOPs according to the present disclosure can include a substrate assembly, which can include a substrate body having a base and a protrusion. The substrate assembly can also include pressure components. The substrate assembly can result in overall improved BOP performance. Additionally, whereas prior art BOP ram bodies are typically made of rubber, BOP ram bodies according to the present disclosure can also include graphene. This results in a harder BOP ram that is more resistant to wear and tear. Normally the additional hardness would result in difficulty forming a seal in the well, but this problem is alleviated by the substrate assembly design.

14 Claims, 5 Drawing Sheets

(56) References Cited

U.S. PATENT DOCUMENTS

| | | | | |
|---|---|---|---|---|
| 7,137,610 | B2* | 11/2006 | Lam | E21B 33/062 |
| | | | | 251/1.3 |
| 8,540,017 | B2* | 9/2013 | Ensley | E21B 33/062 |
| | | | | 166/85.4 |
| 2004/0124380 | A1* | 7/2004 | Van Winkle | E21B 33/06 |
| | | | | 166/85.4 |
| 2005/0211428 | A1* | 9/2005 | Wright | E21B 33/062 |
| | | | | 166/54.1 |
| 2007/0175625 | A1* | 8/2007 | Lam | E21B 19/12 |
| | | | | 166/85.1 |
| 2008/0078965 | A1* | 4/2008 | Lane | E21B 19/12 |
| | | | | 251/1.3 |
| 2014/0034316 | A1* | 2/2014 | Larson | E21B 29/08 |
| | | | | 166/55 |
| 2015/0184481 | A1* | 7/2015 | Painter | E21B 33/062 |
| | | | | 251/1.3 |
| 2017/0370174 | A1* | 12/2017 | Yun | E21B 33/1208 |
| 2018/0258728 | A1* | 9/2018 | Zonoz | E21B 33/06 |
| 2020/0040692 | A1* | 2/2020 | Yun | E21B 33/1208 |

* cited by examiner

BLOWOUT PREVENTER AND COMPONENTS THEREOF

RELATED APPLICATION

This application claims the priority benefit of U.S. Provisional Patent Application No. 63/326,090 to Lombardi et al., filed on Mar. 31, 2022 and entitled "Blowout Preventer and Components Thereof," the entire contents of which are hereby fully incorporated by reference.

BACKGROUND OF THE DISCLOSURE

Field of the Disclosure

Embodiments of the present disclosure relate to blowout preventers, such as those used to seal, control, and/or monitor oil and gas wells to prevent blowouts, and their components.

Related Art

Blowout preventers, or "BOPS," are mechanical devices such as valves that are used to prevent blowouts and/or the uncontrolled release of fluid (e.g., oil or natural gas) from a well. FIG. 1A shows a typical prior art BOP 100. The BOP 100 includes a body 102 and two sealing mechanisms 104, each of which includes a packing gland 106, a packing 108, a cap 110, a ram screw 112, and a ram 114. In typical operation, the BOP 100 is placed around a pipe 130. The sealing mechanisms 104 can be tightened (i.e., moved inward toward one another) through apertures 102a in the body 102 such that the rams 114 form a seal around the pipe 130, thus preventing the uncontrolled release of fluid from around the pipe 130.

Typically, the body 102 and caps 110 are made of metal. The rams 114 are typically made of rubber. The rams 114 may also include a metal substrate either within the body 114a or on a rear side 114b thereof. One example of such a metal substrate, the metal substrate 150, is shown in FIGS. 1B and 1C. The holes 150a (four shown in FIG. 1B) are typically used for the injection of rubber to form the body 114a of the ram 114.

SUMMARY OF THE DISCLOSURE

One embodiment of a blowout preventer (BOP) ram according to the present disclosure comprises a substrate assembly with a substrate body having a substrate base and a substrate protrusion. The BOP ram further comprises a ram body comprising rubber.

One embodiment of a blowout preventer (BOP) ram body according to the present disclosure comprises rubber and graphene.

One embodiment of a blowout preventer (BOP) according to the present disclosure comprises a body configured for attachment to a pipe, the body shaped to define two BOP ram apertures. The BOP further comprises first and second BOP rams for forming a seal around the pipe. Each of the BOP rams comprises a ram body comprising rubber and graphene, and a substrate assembly at least partially in the ram body. The substrate assemblies comprise a substrate body with a substrate base and substrate protrusion, and first and second pressure components attached to the substrate body by one or more fasteners. The first and second pressure components abut the substrate protrusion.

This has outlined, rather broadly, the features and technical advantages of the present disclosure so that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION OF THE DISCLOSURE

Figure 1A:
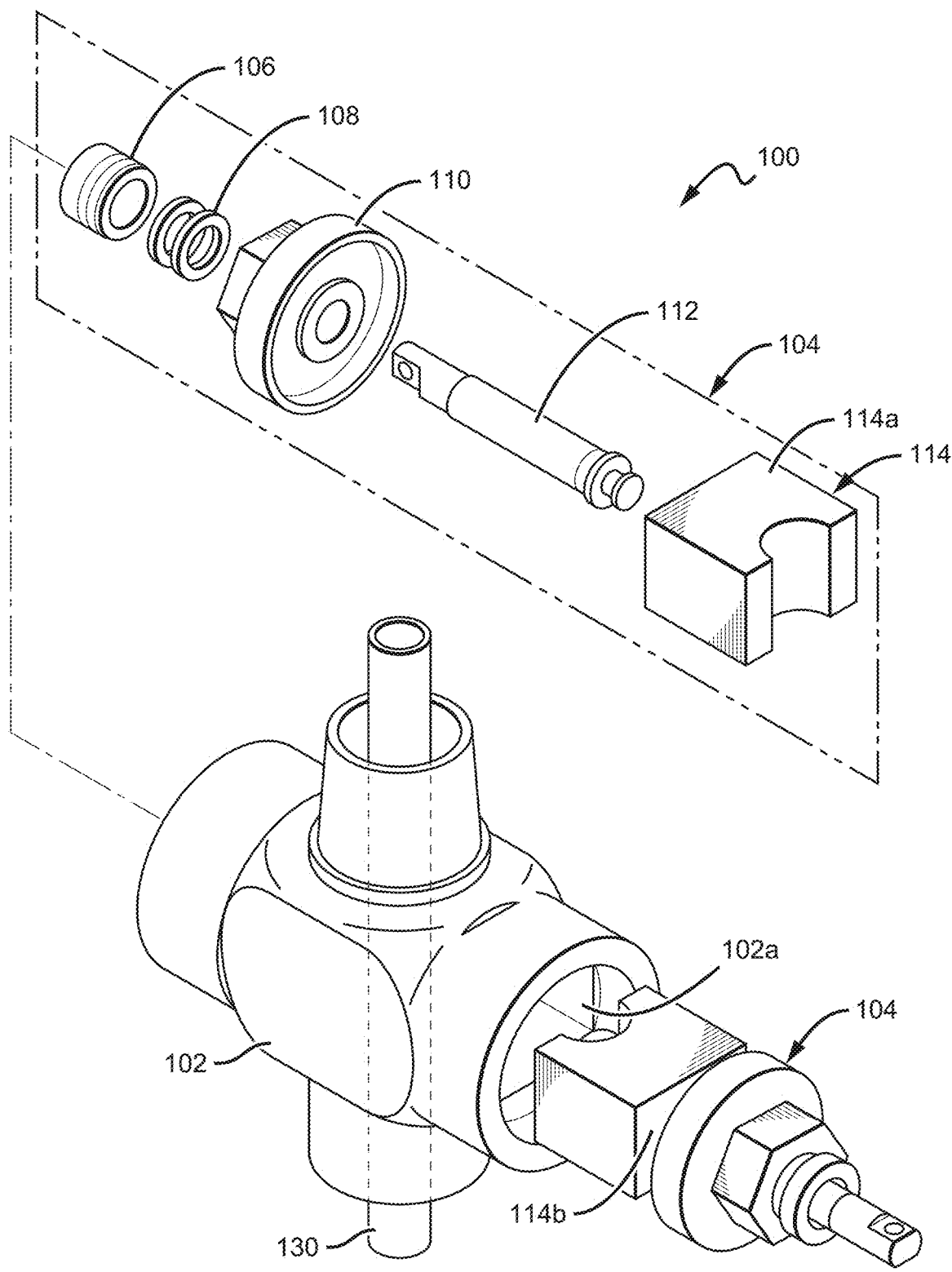
FIG. 1A is a blowout preventer according to the prior art.
Figure 1B:
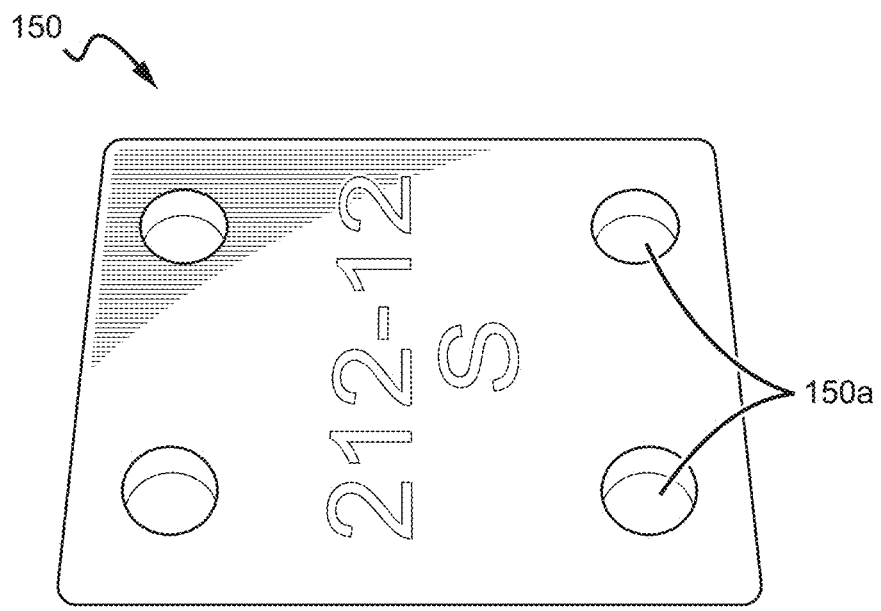
FIGS. 1B and 1C are views of a blowout preventer ram substrate according to the prior art.
Figure 1C:
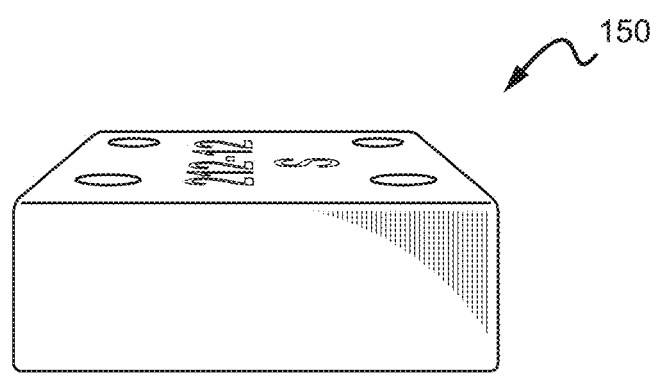
Figure 2A:
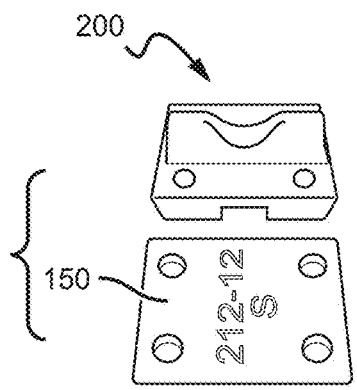
FIGS. 2A-2I show various views of a blowout preventer ram substrate assembly and components thereof according to the present disclosure.
Figure 2B:
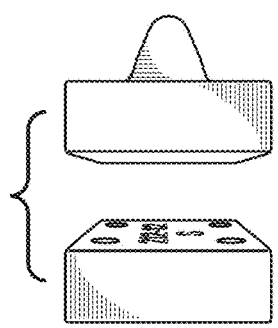
Figure 2C:
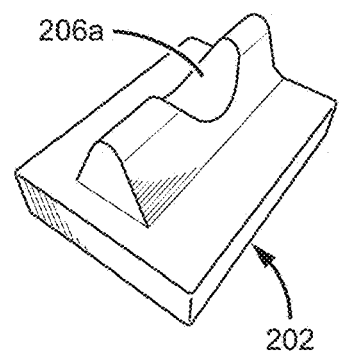
Figure 2D:
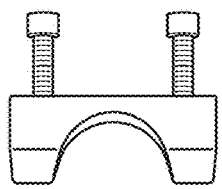
Figure 2E:
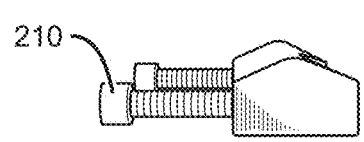
Figure 2F:
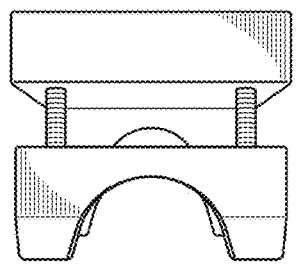
Figure 2G:
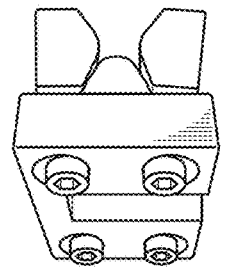
Figure 2H:
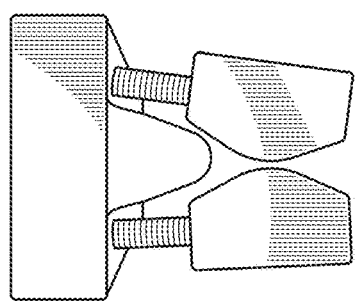
Figure 2I:
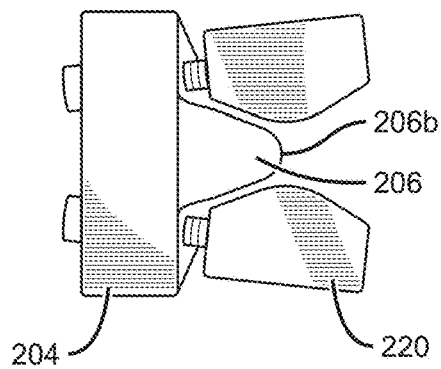

This disclosure relates generally to blowout preventers, or "BOPs," for use in a well. The BOPs according to the present disclosure can include a substrate assembly, which can include a substrate body having a base and a protrusion. The substrate assembly can also include pressure components. The substrate assembly can result in overall improved BOP performance. Additionally, whereas prior art BOP ram bodies are typically made of rubber, BOP ram bodies according to the present disclosure can also include graphene. This results in a harder BOP ram that is more resistant to wear and tear. Normally the additional hardness would result in difficulty forming a seal in the well, but this problem is alleviated by the substrate assembly design.

Embodiments of the disclosure are described herein with reference to illustrations that are schematic illustrations of embodiments of the disclosure. As such, the actual size, components and features can be different, and variations from the shapes of the illustrations as a result, for example, of technological capabilities, manufacturing techniques and/or tolerances are expected. Embodiments of the disclosure should not be construed as limited to the particular shapes or components of the regions illustrated herein but are to include deviations in shapes/components that result, for example, from manufacturing or technological availability. The regions illustrated in the figures are schematic in nature and their shapes are not intended to illustrate the precise shape or functionality of a feature of a device and are not intended to limit the scope of the disclosure. In addition, components may be shown as one unit but may instead be a collection of components or units, or a collection of components or units may exist as one unit.

Throughout this description, the preferred embodiment and examples illustrated should be considered as exemplars, rather than as limitations on the present disclosure. As used herein, the term "disclosure," "device," "method," "present disclosure," "present device" or "present method" refers to any one of the embodiments of the disclosure described herein, and any equivalents. Furthermore, reference to various feature(s) of the "disclosure," "device," "method," "present disclosure," "present device" or "present method" throughout this document does not mean that all claimed embodiments or methods must include the referenced feature(s).

It is also understood that when an element or feature is referred to as being "on" or "adjacent" another element or feature, it can be directly on or adjacent to the other element or feature, or intervening elements or features may also be present. It is also understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," "including," and similar terms, when used herein, specify the presence of stated features, integers, steps, operations, elements, and/or components, but do not preclude the presence or addition of one or more other features, integers, steps, operations, elements, components, and/or groups thereof.

It should be understood that while the word "assembly" as used herein typically refers to multipiece components, it should be interpreted to encompass singular and/or monolithic components as would be understood by one of skill in the art unless the context clearly indicates otherwise.

Ram Substrate and Assembly

FIGS. 2A-2I show one embodiment of a BOP ram substrate assembly 200 according to the present disclosure. The ram substrate assembly 200 can include a substrate body 202 with a substrate base 204 and a substrate protrusion 206. The substrate base 204 can be substantially rectangular and/or equivalent to the prior art substrate 150. The substrate protrusion 206 can run substantially longitudinally along the front surface of the substrate base 204. The substrate protrusion 206 can include a protrusion cutout 206a, which can be arcular and/or semicircular, and/or otherwise configured to correspond to the shape of the pipe with which the assembly 200 is to be used. Similarly, pressure components 220 (discussed more fully below) can also each include a cutout that can be arcular and/or semicircular, and/or otherwise configured to correspond to the shape of the pipe.

In the present embodiment, the substrate body 202, including the substrate base 204 and substrate protrusion 206, is a singular, integral, and/or monolithic piece, but it should be understood that other embodiments are possible, such as embodiments where the substrate and protrusion are separate pieces.

The assembly 200 can further include one or more pressure components 220. The pressure components 220 can be attached to the substrate body 202, such as via fasteners 210 such as screws, bolts, or other fasteners, though it is understood that other embodiments (such as where the pressure components 220 are integral with the substrate body 202) are possible. In addition to the holes 150a being used for rubber injection, in the assembly 200 they can also be used as fastener holes through which the fasteners 210 can pass to attach the assembly components to one another. The protrusion 206 can include a convex outer surface 206b. The pressure components 220 can include a surface that matches and/or abuts the convex outer surface 206b of the protrusion 206. The pressure components 220 can be made of the same material as the substrate body 202, such as metal, though it is understood that other embodiments are possible.

Figure 3A:
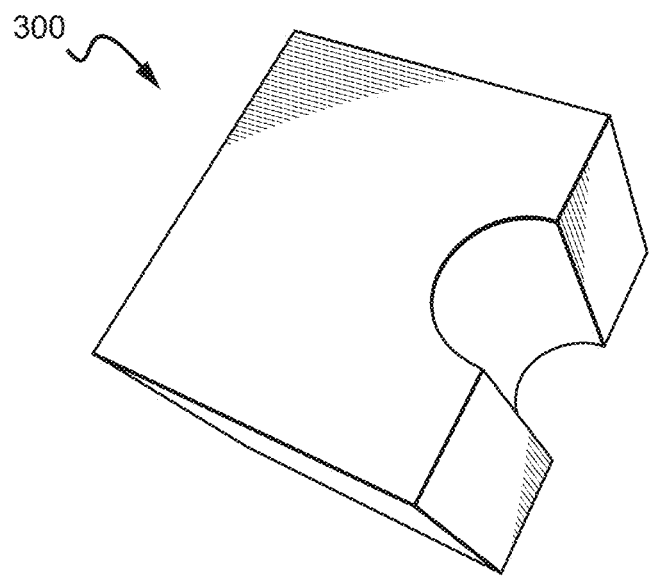
FIGS. 3A and 3B are views of a blowout preventer ram according to the present disclosure.
Figure 3B:
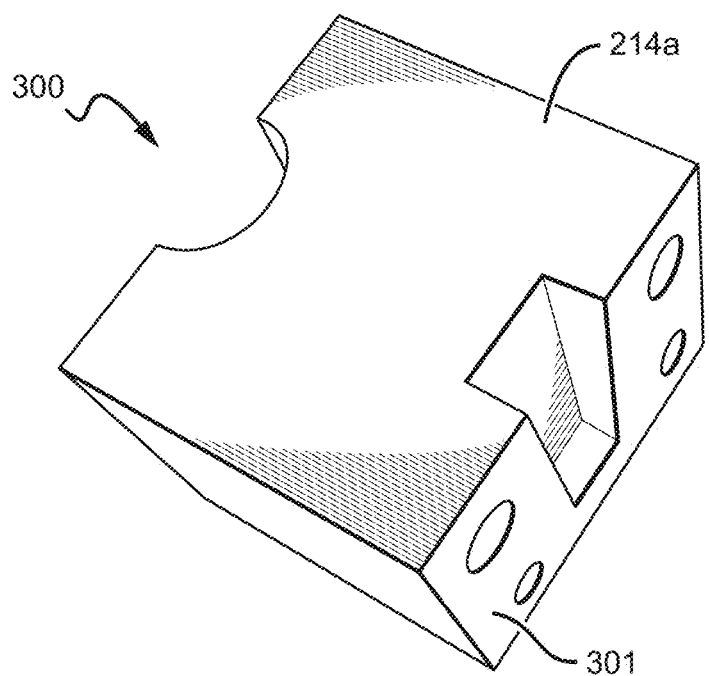

FIGS. 3A and 3B show an embodiment of a ram 300 according to the present disclosure. The ram 300 includes a substrate assembly 301, which can be the same as or similar to the substrate assembly 200. The protrusion 206 and pressure components 220 can be fully enclosed within a ram body 214a, which can be the same as or similar to the ram body 114a. In one embodiment, the ram body 214a (often made of rubber) is molded around the protrusion 206 and pressure components 220. The ram 300 can be shaped the same as or similarly to prior art rams, such as the ram 114.

Figure 4A:
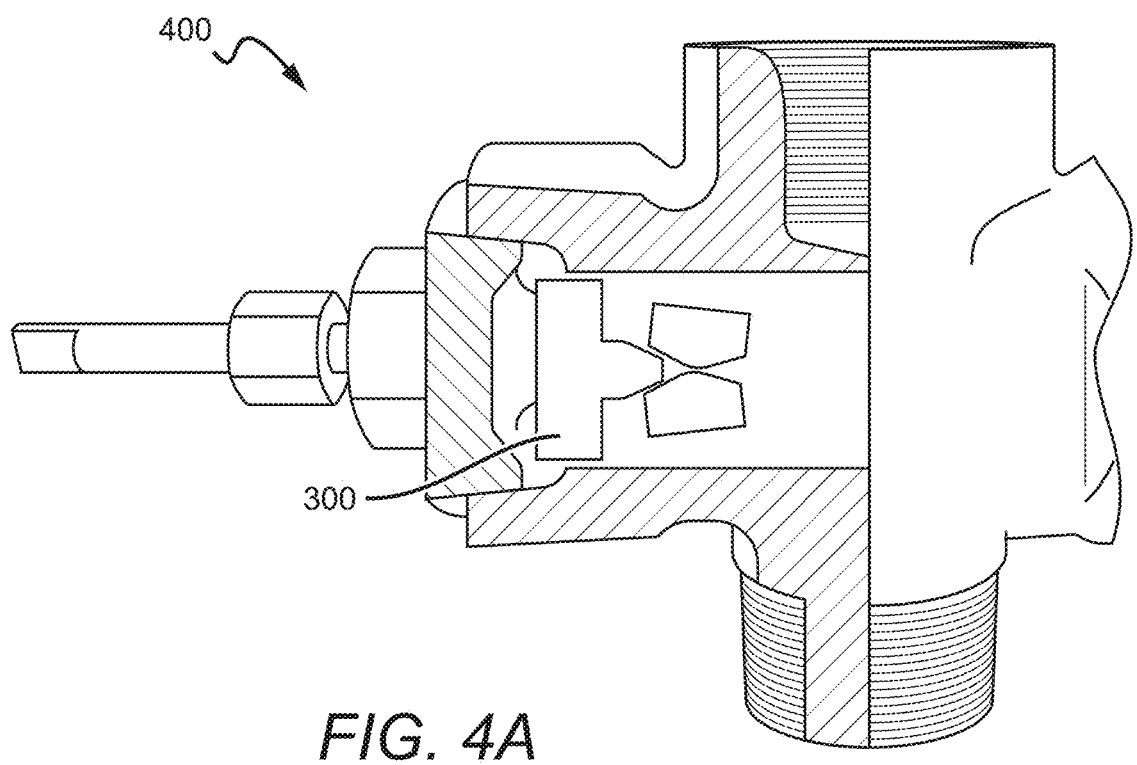
FIGS. 4A and 4B are cutaway views of a blowout preventer with blowout preventer ram according to the present disclosure, attached to a pipe.
Figure 4B:
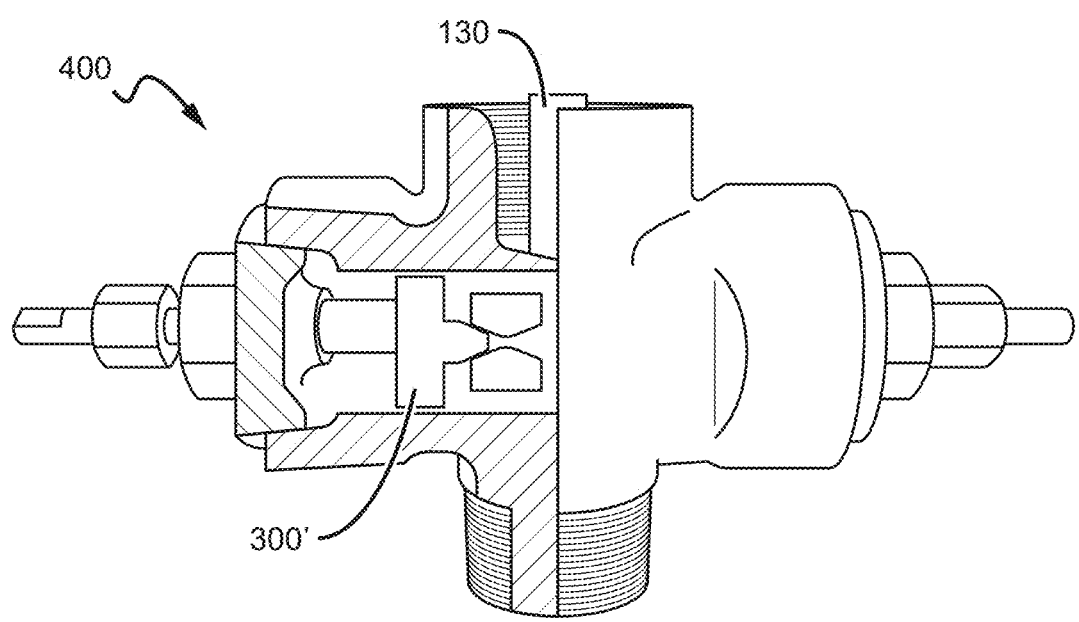

FIGS. 4A and 4B show an embodiment of a BOP 400 including the ram 300, with the BOP 400 attached to a pipe 130. In FIG. 4A, the BOP 400 is in an open configuration, which is typical of when a well is operating normally and releasing fluid. In FIG. 4B, the BOP 400 is in a closed configuration, with the ram 300' pressed inward. The design of the ram 300 including the substrate protrusion 206 and pressure components 220 results in greater expansion of the ram body 214a both inward toward the pipe 130, and also in the upward and downward directions. This improved expansion results in overall improved performance and better sealing than prior art devices.

Ram Body Composition

Typical prior art rams such as the ram 114 include a basic rubber ram body 114a. BOPs and rams according to the present disclosure can include a ram body 214a with altered composition to increase performance. In one specific embodiment, the ram body 214a is a 55 to 75 shore, or 60 to 70 shore, or 65 shore HNBR that is then mixed with graphene, such as graphene nanopowder. The graphene nanopowder can have extremely high surface area. One example of suitable graphene nanopowder is 1-3 layer/1-5 nm Area-($m^2$/g): 300. This mixing of the rubber and graphene nanopowder results in the ram body 214a having increased hardness, such as 70 shore or greater, 75 shore or greater, 80 shore or greater, 70 shore to 100 shore, or 75 shore to 90 shore, or 80±5 shore, or 80±3 shore, or about 80 shore.

The added hardness of the ram 300 makes the ram 300 more difficult to seal. However, this problem is lessened or eliminated due to the new design of the ram 300, including the substrate protrusion 206 and/or pressure components 220, which results in greater expansion of the ram body 214a as previously described. As such, the ram 300 can form a better seal with less wrench pressure than prior art devices.

The ram 300 including graphene nanopowder results in much greater resistance to elements such as high temperatures, $H_2S$, corrosion, and chemicals, which are known to cause degradation of prior art rams. Rubber extrusion into the bore is also reduced or eliminated. Inclusion of the ram 300 instead of a prior art ram approximately doubles the rated pressure of the BOP 400, with less or no extrusion into the bore, reducing the chances of losing pressure or blowing out.

The graphene (in this case graphene nanopowder, though other embodiments are possible) can be injected into the rubber. In one embodiment of a method of forming the ram 300 according to the present disclosure, one or both sides of a rubber sheet are coated with the graphene (e.g. graphene nanopowder). A press (e.g. a cylindrical press) can be used to distribute the graphene throughout the rubber, using pressure and/or heat over a period of time. This can result in the graphene being approximately uniformly distributed within the rubber. Other methods as would be understood by one of skill in the art are possible. For instance, in another method, the graphene nanopowder is mixed into the rubber prior to the rubber being cured and/or hardened.

Although the present disclosure has been described in detail with reference to certain preferred configurations thereof both in the specification and in the claims, other versions are possible. Embodiments of the present disclosure can comprise any combination of compatible devices/features described herein and/or shown in the figures, and these embodiments should not be limited to those expressly illustrated and discussed. For instance and not by way of limitation, the appended claims could be modified to be multiple dependent claims so as to combine any combinable combination of elements within a claim set, or from differing claim sets. The spirit and scope of the disclosure should not be limited to the versions described above.

The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

We claim:

1. A blowout preventer (BOP) ram, comprising:
   a substrate assembly comprising a substrate body and one or more pressure components attached to said substrate body, said substrate body comprising a substrate base and a substrate protrusion on said substrate base; and
   a ram body comprising rubber and graphene distributed in said rubber;
   wherein said substrate body is at least partially enclosed within said ram body; and
   wherein said one or more pressure components are fully enclosed within said ram body.

2. The BOP ram of claim 1, wherein said substrate base and said substrate protrusion are monolithic.

3. The BOP ram of claim 1, wherein each of said pressure components is attached to said substrate body by one or more fasteners.

4. The BOP ram of claim 1, wherein said one or more pressure components abut said substrate protrusion.

5. The BOP ram of claim 1, comprising two of said pressure components.

6. The BOP ram of claim 5, wherein said substrate protrusion runs longitudinally on a front surface of said substrate base, wherein a first of said pressure components is above said substrate protrusion, and wherein a second of said pressure components is below said substrate protrusion.

7. The BOP ram of claim 1, wherein said substrate base, said substrate protrusion, and said one or more pressure components are metal.

8. The BOP ram of claim 1, wherein said one or more pressure components are shaped to define a cutout.

9. The BOP ram of claim 1, wherein said substrate body is metal.

10. The BOP ram of claim 1, wherein said substrate protrusion is shaped to define a protrusion cutout.

11. The BOP ram of claim 1, wherein said substrate protrusion is within said ram body.

12. A blowout preventer (BOP), comprising:
    a body configured for attachment to a pipe, said body shaped to define two BOP ram apertures; and
    first and second BOP rams for forming a seal around said pipe, each of said BOP rams comprising:
      a ram body comprising rubber and graphene, wherein said rubber is less than 70 shore and said ram body is 70 shore or harder; and
      a substrate assembly at least partially in said ram body, said substrate assembly comprising:
        a substrate body comprising a substrate base and substrate protrusion from a front surface of said substrate base;
        a first pressure component above said substrate protrusion, encased in said ram body, and attached to said substrate body by one or more fasteners each through a respective fastener hole on said front surface; and
        a second pressure component below said substrate protrusion, encased in said ram body, and attached to said substrate body by one or more fasteners each through a respective fastener hole on said front surface.

13. The BOP of claim 12, wherein each of said substrate protrusions runs longitudinally across its respective front surface.

14. The BOP of claim 12, configured such that as each of said first and second BOP rams is moved toward said pipe, its respective substrate protrusion pushes its respective first pressure component inward and upward and its respective second pressure component inward and downward.

* * * * *